(12) United States Patent
Dinardo

(10) Patent No.: US 6,226,229 B1
(45) Date of Patent: May 1, 2001

(54) CAT CALLING DEVICE

(76) Inventor: Sam Dinardo, 14944 Sherman Way #B109, Van Nuys, CA (US) 91405

( * ) Notice: Subject to any disclaimer, the term of this patent is extended or adjusted under 35 U.S.C. 154(b) by 0 days.

(21) Appl. No.: 09/397,605

(22) Filed: Sep. 16, 1999

(51) Int. Cl.[7] .............................. H04B 1/02; A01K 15/02
(52) U.S. Cl. ........................ 367/139; 119/712; 119/719
(58) Field of Search ........................... 367/139; 119/712, 119/713, 719, 905; 116/22 A

(56) References Cited

U.S. PATENT DOCUMENTS

Re. 36,322 * 10/1999 Whitaker ........................... 119/719
4,896,305 * 1/1990 Gimbal .............................. 367/139
5,894,275 * 4/1999 Swingle ............................ 340/692

* cited by examiner

Primary Examiner—Ian J. Lobo
(74) Attorney, Agent, or Firm—Goldstein & Canino

(57) ABSTRACT

A cat calling device including a housing having a front face and a rear face. A recording mechanism is disposed within the housing. A playback mechanism is disposed within the housing. The playback mechanism is in communication with the recording means. The playback mechanism includes a plurality of playback buttons disposed within the front face of the housing. Each of the buttons serves to play a separate recording from the recording means. The playback mechanism includes a speaker disposed within the front face of the housing.

9 Claims, 1 Drawing Sheet

CAT CALLING DEVICE

BACKGROUND OF THE INVENTION

The present invention relates to a cat calling device and more particularly pertains to enabling a cat owner to call their cat using a plurality of stimuli.

Cat owners often find it difficult to get their cats to come to them when they want them to. The owners typically have to resort to opening a can of food or other action attractive to the cat in order to draw the cat out of their hiding place. Most of the time, however, pet owners do not want to open a can of food or, otherwise, they are in a hurry to locate their cat. Thus, there is a need for some type of artificial stimulus that will allow a cat owner to have their cat respond to and, subsequently, come forth from their hidden location.

The present invention attempts to solve the abovementioned problem by providing a device that will record and play back selected sounds and/or voices that will serve to draw their cat out of a particular hiding place.

The use of pet amusement devices is known in the prior art. More specifically, pet amusement devices heretofore devised and utilized for the purpose of providing amusement for pets are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,724,919 to Boyd discloses a sound producing device for evoking a response in an animal using various frequencies. U.S. Pat. No. 5,634,436 to Coombs discloses a device capable of producing an audio output for amusing an animal. U.S. Pat. No. 4,185,588 to Harris discloses a pet feeding device.

While these devices fulfill their respective, particular objective and requirements, the aforementioned patents do not describe a cat calling device for enabling a cat owner to call their cat using a plurality of stimuli.

In this respect, the cat calling device according to the present invention substantially departs from the conventional concepts and designs of the prior art, and in doing so provides an apparatus primarily developed for the purpose of enabling a cat owner to call their cat using a plurality of stimuli.

Therefore, it can be appreciated that there exists a continuing need for a new and improved cat calling device which can be used for enabling a cat-owner to call their cat using a plurality of stimuli. In this regard, the present invention substantially fulfills this need.

SUMMARY OF THE INVENTION

In the view of the foregoing disadvantages inherent in the known types of pet amusement devices now present in the prior art, the present invention provides an improved cat calling device. As such, the general purpose of the present invention, which will be described subsequently in greater detail, is to provide a new and improved cat calling device and method which has all the advantages of the prior art and none of the disadvantages.

To attain this, the present invention essentially comprises a housing having a generally rectangular configuration. The housing has a front face and a rear face. A recording means is disposed within the housing. The recording means includes an activation button disposed in the front face of the housing. A playback means is disposed within the housing. The playback means is in communication with the recording means. The playback means includes a plurality of playback buttons disposed within the front face of the housing. Each of the buttons serves to play a separate recording from the recording means. The playback means includes a speaker disposed within the front face of the housing. A clear pocket is secured to the rear face of the housing. The clear pocket has an open first end and a closed second end. The open first end receives an identifying label therein. The open first end has a notch formed therein. A magnet is secured to the rear face of the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cat calling device which has all the advantages of the prior art pet amusement devices and none of the disadvantages.

It is another object of the present invention to provide a new and improved cat calling device which may be easily and efficiently manufactured and marketed.

It is a further object of the present invention to provide a new and improved cat calling device which is of durable and reliable construction.

An even further object of the present invention is to provide a new and improved cat calling device which is susceptible of a low cost of manufacture with regard to both materials and labor, and which accordingly is then susceptible of low prices of sale to the consuming public, thereby making such a cat calling device economically available to the buying public.

Even still another object of the present invention is to provide a new and improved cat calling device for enabling a cat owner to call their cat using a plurality of stimuli.

Lastly, it is an object of the present invention to provide a new and improved cat calling device including a housing having a front face and a rear face. A recording means is disposed within the housing. A playback means is disposed within the housing. The playback means is in communication with the recording means. The playback means includes a plurality of playback buttons disposed within the front face of the housing. Each of the buttons serves to play a separate recording from the recording means. The playback means includes a speaker disposed within the front face of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 2:
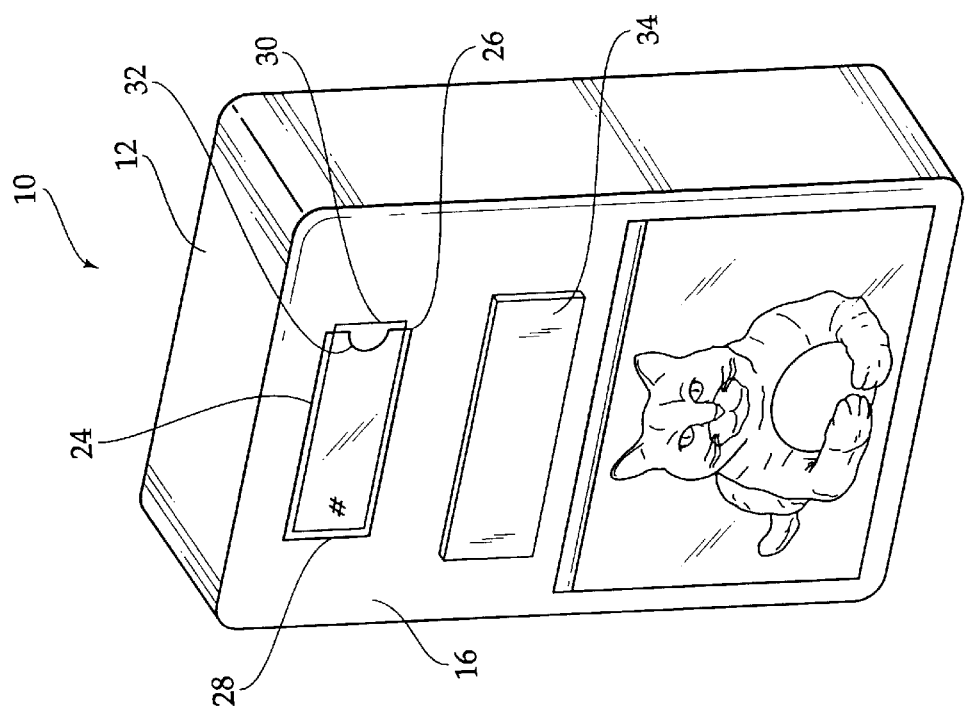
FIG. 2 is a rear perspective view of the present invention.
Figure 1:
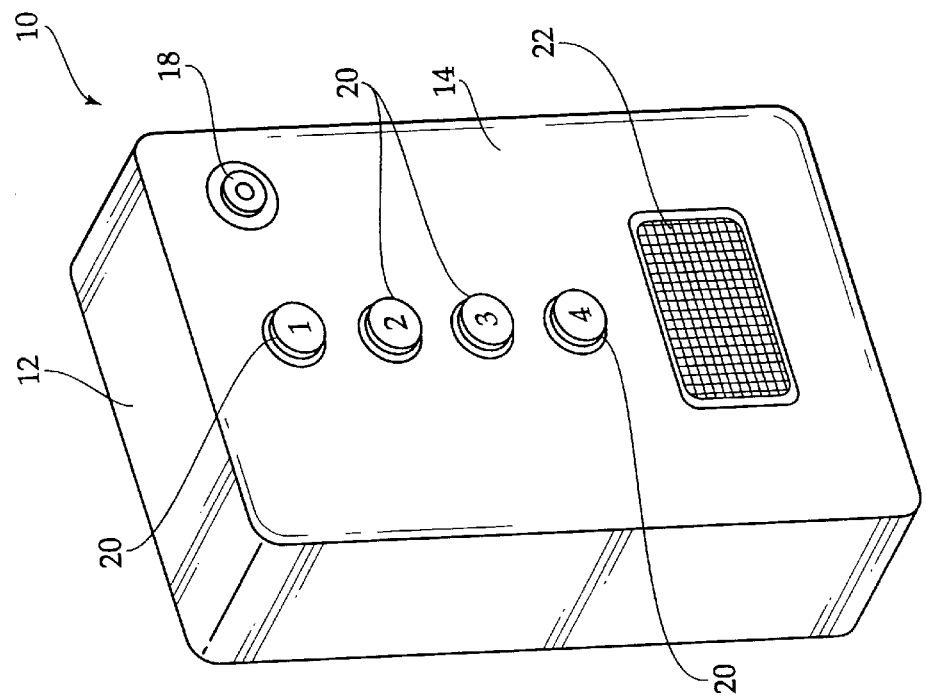
FIG. 1 is a perspective view of the preferred embodiment of the cat calling device constructed in accordance with the principles of the present invention.

With reference now to the drawings, and in particular, to FIGS. 1 and 2 thereof, the preferred embodiment of the new and improved cat calling device embodying the principles and concepts of the present invention and generally designated by the reference number 10 will be described.

Specifically, it will be noted in the various Figures that the device relates to a cat calling device for enabling a cat owner to call their cat using a plurality of stimuli. In its broadest context, the device consists of a housing, a recording means, a playback means, a clear pocket, and a magnet. Such components are individually configured and correlated with respect to each other so as to attain the desired objective.

The housing 12 has a generally rectangular configuration. The housing 12 has a front face 14 and a rear face 16.

The recording means is disposed within the housing 12. The recording means includes an activation button 18 disposed in the front face 14 of the housing 12.

The playback means is disposed within the housing 12. The playback means is in communication with the recording means. The playback means includes a plurality of playback buttons 20 disposed within the front face 14 of the housing 12. Each of the buttons 20 serves to play a separate recording from the recording means. The playback means includes a speaker 22 disposed within the front face 14 of the housing 12. Each of the playback buttons 20 will allow for a sound to played that a cat would normally respond to. The sounds can include, but are not limited to, the cat owner's voice calling the cat's name, an electric can opener opening a can of cat food, a spoon scraping against an inside of a can of cat food, and a box of dry cay food being shaken. By pressing one of these buttons 20, the selected sound will be sounded through the speaker for a cat to respond to.

The clear pocket 24 is secured to the rear face 16 of the housing 12. The clear pocket 24 has an open first end 26 and a closed second end 28. The open first end 26 receives an identifying label 30 therein. The identifying label 30 will preferably indicate a number for the cat's veterinarians telephone number. The open first end 26 has a notch 32 formed therein.

The magnet 34 is secured to the rear face of the housing. The magnet 34 allows the device 10 to be secured to a magnetic surface, such as a refrigerator.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A cat calling device for enabling a cat owner to call their cat using a plurality of stimuli comprising, in combination:

a housing having a generally rectangular configuration, the housing having a front face and a rear face;

a recording means disposed within the housing, the recording means including an activation button disposed in the front face of the housing;

a playback means disposed within the housing, the playback means being in communication with the recording means, the playback means including a plurality of playback buttons disposed within the front face of the housing, each of the buttons serving to play a separate recording from the recording means, the playback means including a speaker disposed within the front face of the housing;

a clear pocket secured to the rear face of the housing, the clear pocket having an open first end and a closed second end, the open first end receiving an identifying label therein, the open first end having a notch formed therein;

a magnet secured to the rear face of the housing.

2. The cat calling device as set forth in claim 1 wherein the separate recording resembles a cat owner's voice calling a cat's name.

3. The cat calling device as set forth in claim 1 wherein the separate recording resembles a sound of an electric can opener.

4. The cat calling device as set forth in claim 1 wherein the separate recording resembles a sound of a spoon scraping against an inside of a can.

5. The cat calling device as set forth in claim 1 wherein the separate recording resembles a sound of a box cat food being shaken.

6. A cat calling device for enabling a cat owner to call their cat using a plurality of stimuli comprising, in combination:

a housing having a front face and a rear face;

a recording means disposed within the housing;

a playback means disposed within the housing, the playback means being in communication with the recording means, the playback means including a plurality of playback buttons disposed within the front face of the housing, each of the buttons serving to play a separate recording from the recording means, the playback means including a speaker disposed within the front face of the housing.

7. The cat calling device as set forth in claim 6 wherein the recording means includes an activation button disposed in the front face of the housing.

8. The cat calling device as set forth in claim 6 and further including a clear pocket secured to the rear face of the housing, the clear pocket having an open first end and a closed second end, the open first end receiving an identifying label therein, the open first end having a notch formed therein.

9. The cat calling device as set forth in claim 6 and further including a magnet secured to the rear face of the housing.

* * * * *